(12) United States Patent
Weiss et al.

(10) Patent No.: US 12,365,842 B2
(45) Date of Patent: *Jul. 22, 2025

(54) METHOD FOR PROCESSING PLASTIC PYROLYSIS OILS WITH A VIEW TO THEIR USE IN A STEAM-CRACKING UNIT

(71) Applicant: IFP Energies Nouvelles, Rueil-Malmaison (FR)

(72) Inventors: Wilfried Weiss, Rueil-Malmaison (FR); Jerome Bonnardot, Rueil-Malmaison (FR)

(73) Assignee: IFP Energies Nouvelles, Rueil-Malmaison (FR)

( * ) Notice: Subject to any disclaimer, the term of this patent is extended or adjusted under 35 U.S.C. 154(b) by 80 days.

This patent is subject to a terminal disclaimer.

(21) Appl. No.: 17/781,078

(22) PCT Filed: Nov. 16, 2020

(86) PCT No.: PCT/EP2020/082213
§ 371 (c)(1),
(2) Date: May 31, 2022

(87) PCT Pub. No.: WO2021/110395
PCT Pub. Date: Jun. 10, 2021

(65) Prior Publication Data
US 2023/0002688 A1 Jan. 5, 2023

(30) Foreign Application Priority Data
Dec. 2, 2019 (FR) ...................................... 1913625

(51) Int. Cl.
*C10G 65/06* (2006.01)
*C10G 1/00* (2006.01)
(Continued)

(52) U.S. Cl.
CPC ............. *C10G 65/06* (2013.01); *C10G 1/002* (2013.01); *C10G 1/10* (2013.01); *C10G 9/36* (2013.01);
(Continued)

(58) Field of Classification Search
None
See application file for complete search history.

(56) References Cited

U.S. PATENT DOCUMENTS 3,492,220 A    1/1970   Lempert et al.
5,068,484 A *  11/1991  James, Jr. ............. C10G 65/06
                                                         585/641

(Continued)

FOREIGN PATENT DOCUMENTS

FR       3054557 A1       2/2018
JP       H0985046 A   *   3/1997    ............ Y02W 30/62
WO       WO-2020252228 A1 * 12/2020  ............ C10B 49/22

OTHER PUBLICATIONS

Machine translation JP H0985046. Retrieved Jan. 24, 2024 (Year: 2024).*

(Continued)

*Primary Examiner* — Bobby Ramdhanie
*Assistant Examiner* — Alyssa L Cepluch
(74) *Attorney, Agent, or Firm* — Millen, White, Zelano & Branigan, P.C.; Brion P. Heaney (57) ABSTRACT

A process for treating a plastics pyrolysis oil:
  a) selective hydrogenation of feedstock in the presence of hydrogen and at least one selective hydrogenation catalyst, at 100 to 150° C., a partial pressure of hydrogen of 1.0 to 10.0 MPa abs. and an hourly space velocity of 1.0 to 10.0 $h^{-1}$, to obtain a hydrogenated effluent;
  b) hydrotreatment of hydrogenated effluent in the presence of hydrogen and at least one hydrotreatment
(Continued)

catalyst, at 250 to 370° C., a partial pressure of hydrogen of 1.0 to 10.0 MPa abs. and an hourly space velocity of 1.0 to 10.0 $h^{-1}$, to obtain a hydrotreatment effluent;

c) separation of hydrotreatment effluent obtained from b) in the presence of an aqueous stream, at a temperature of 50 to 370° C., to obtain at least one gaseous effluent, an aqueous liquid effluent and a hydrocarbon liquid effluent.

19 Claims, 1 Drawing Sheet

(51) Int. Cl.
| | |
|---|---|
| *C10G 1/10* | (2006.01) |
| *C10G 9/36* | (2006.01) |
| *C10G 25/00* | (2006.01) |
| *C10G 45/38* | (2006.01) |
| *C10G 49/00* | (2006.01) |
| *C10G 49/04* | (2006.01) |
| *C10G 67/06* | (2006.01) |
| *C10G 69/06* | (2006.01) |

(52) U.S. Cl.
CPC .............. *C10G 25/00* (2013.01); *C10G 45/38* (2013.01); *C10G 49/002* (2013.01); *C10G 49/04* (2013.01); *C10G 67/06* (2013.01); *C10G 69/06* (2013.01); *C10G 2300/1003* (2013.01); *C10G 2300/201* (2013.01); *C10G 2300/4006* (2013.01); *C10G 2300/4012* (2013.01); *C10G 2300/4018* (2013.01); *C10G 2300/70* (2013.01)

(56) References Cited

U.S. PATENT DOCUMENTS

| | | | | |
|---|---|---|---|---|
| 5,904,838 | A * | 5/1999 | Kalnes | C10G 65/04 |
| | | | | 208/143 |
| 2011/0277377 | A1* | 11/2011 | Novak | C10L 1/026 |
| | | | | 44/435 |
| 2015/0014218 | A1 | 1/2015 | Bisht et al. | |
| 2016/0002544 | A1* | 1/2016 | Sorensen, Jr. | C10G 45/32 |
| | | | | 585/24 |
| 2016/0264874 | A1* | 9/2016 | Narayanaswamy | C10G 1/10 |
| 2018/0155633 | A1* | 6/2018 | Al-Ghamdi | C10G 9/005 |
| 2019/0161683 | A1* | 5/2019 | Narayanaswamy | C10G 69/14 |
| 2019/0270939 | A1 | 9/2019 | Javeed et al. | |
| 2019/0299491 | A1 | 10/2019 | Stanislaus et al. | |

OTHER PUBLICATIONS

International Search Report dated Feb. 17, 2021 issued in corresponding PCT/EP2020/082213 application (3 pages).

* cited by examiner

METHOD FOR PROCESSING PLASTIC PYROLYSIS OILS WITH A VIEW TO THEIR USE IN A STEAM-CRACKING UNIT

TECHNICAL FIELD

The present invention relates to a process for treating a plastics pyrolysis oil so as to obtain a hydrocarbon effluent, the composition of which is compatible with a feedstock feeding a steam cracking unit. More particularly, the present invention relates to a process for treating a feedstock obtained from the pyrolysis of plastic waste, so as to at least partly remove impurities, notably olefins (monoolefins and diolefins), metals, in particular silicon, and halogens, in particular chlorine, which said feedstock may contain in relatively large amounts, and so as to hydrogenate the feedstock so as to be able to upgrade it in a steam cracking unit with increased yields of light olefins.

PRIOR ART

Plastics obtained from collection and sorting channels may undergo a step of pyrolysis so as to obtain, inter alia, pyrolysis oils. These plastics pyrolysis oils are generally burnt to generate electricity and/or used as fuel in industrial boilers or urban heating.

Another route for upgrading plastics pyrolysis oils could be the use of these plastics pyrolysis oils as feedstock for a steam cracking unit so as to (re)create olefins, said olefins being constituent monomers of certain polymers. However, plastic waste is generally mixtures of several polymers, for example mixtures of polyethylene, polypropylene, polyethylene terephthalate, polyvinyl chloride and polystyrene. Furthermore, depending on the applications, the plastics may contain, in addition to polymers, other compounds, such as plasticizers, pigments, dyes or polymerization catalyst residues. Plastic waste may also contain, in a minor amount, biomass originating, for example, from household waste. As a result, the oils obtained from the pyrolysis of plastic waste comprise a lot of impurities, in particular diolefins, metals, notably silicon, or halogenated compounds, notably chlorine-based compounds, heteroelements such as sulfur, oxygen and nitrogen, and insoluble matter, in contents that are often high and incompatible with steam cracking units or units located downstream of the steam cracking units, notably polymerization processes and selective hydrogenation processes. These impurities may give rise to operability problems and notably problems of corrosion, coking or catalytic deactivation, or alternatively incompatibility problems in the applications of the target polymers. The presence of diolefins may also lead to problems of instability of the pyrolysis oil, characterized by the formation of gums. This phenomenon is generally limited by appropriate storage of the feedstock. The gums and the insoluble matter that may be present in pyrolysis oil can give rise to problems of clogging in the processes.

Furthermore, during the steam cracking step, the yields of light olefins sought for petrochemistry, notably ethylene and propylene, depend greatly on the quality of the feedstocks sent for steam cracking. The BMCI (Bureau of Mines Correlation Index) is often used to characterize hydrocarbon cuts. Globally, the yields of light olefins increase when the paraffin content increases and/or when the BMCI decreases. Conversely, the yields of undesired heavy compounds and/or of coke increase when the BMCI increases.

WO 2018/055555 proposes an overall process for recycling plastic waste, which is very general, ranging from the very step of pyrolysis of the plastic waste up to the steam cracking step. The process of application WO 2018/055555 comprises, inter alia, a step of hydrotreating the liquid phase obtained directly from the pyrolysis, preferably under quite stringent conditions notably in terms of temperature, for example at a temperature of between 260 and 300° C., a step of separation of the hydrotreatment effluent and then a step of hydrodealkylation of the heavy effluent separated out, preferably at a high temperature, for example between 260 and 400° C.

The present invention aims to overcome these drawbacks and to participate in the recycling of plastics, by proposing a process for treating an oil resulting from the pyrolysis of plastics to purify it and hydrotreat it in order to obtain a hydrocarbon effluent with a reduced content of impurities, the composition of which is compatible with a feedstock feeding a steam cracking unit, leads to improved yields of light olefins during the steam cracking step, while in particular reducing the risks of clogging during steps for treating plastics pyrolysis oils, such as those described in the prior art, and the formation of coke in large amounts and/or the risks of corrosion encountered during a step for steam cracking plastics pyrolysis oils.

SUMMARY OF THE INVENTION

The invention relates to a process for treating a feedstock comprising a plastics pyrolysis oil, comprising at least the following steps:

a) a selective hydrogenation step performed in a reaction section fed with said feedstock and a gaseous stream comprising hydrogen, in the presence of at least one selective hydrogenation catalyst, at a temperature of between 100 and 250° C., a partial pressure of hydrogen of between 1.0 and 10.0 MPa abs. and an hourly space velocity of between 1.0 and 10.0 $h^{-1}$, to obtain a hydrogenated effluent;

b) a hydrotreatment step performed in a hydrotreatment reaction section, comprising a fixed-bed reactor containing n catalytic beds, n being an integer greater than or equal to 1, placed in series and each comprising at least one hydrotreatment catalyst, said hydrotreatment reaction section being fed, at the first catalytic bed, with said hydrogenated effluent obtained from step a) and a gaseous stream comprising hydrogen and used at a temperature of between 250 and 430° C., a partial pressure of hydrogen of between 1.0 and 10.0 MPa abs. and an hourly space velocity of between 0.1 and 10.0 $h^{-1}$, to obtain a hydrotreatment effluent;

c) a separation step, fed with the hydrotreatment effluent obtained from step b) and an aqueous solution, said step being performed at a temperature of between 50 and 370° C., to obtain at least one gaseous effluent, an aqueous effluent and a hydrocarbon effluent.

The advantage of the process of the invention is to provide a precise sequence of operations which makes it possible to rid an oil resulting from the pyrolysis of plastic waste of at least a part of its impurities, to hydrogenate it to make it in particular compatible with treatment in a steam cracking unit in order to be able to recreate light olefins with increased yields which may be used as monomers in the production of polymers. The invention also makes it possible to prevent risks of clogging and/or corrosion of the treatment unit in which the process of the invention is performed, the risks being exacerbated by the presence, often in large amounts, of diolefins, metals and halogenated compounds in the plastics pyrolysis oil.

The process of the invention thus makes it possible to obtain an effluent obtained from a plastics pyrolysis oil which is at least partly freed of the impurities of the starting plastics pyrolysis oil, thus limiting the problems of operability, such as the corrosion, coking or catalytic deactivation problems, to which these impurities may give rise, in steam cracking units and/or in units located downstream of the steam cracking units, notably the polymerization and selective hydrogenation units. The removal of at least a part of the impurities from the oils obtained from the pyrolysis of plastic waste will also make it possible to increase the range of applications of the target polymers, the application incompatibilities being reduced.

The invention has the further advantage of participating in the recycling of plastics and in conserving the fossil resources, by enabling the upgrading of oils resulting from their pyrolysis in a steam cracking unit. It allows, in fact, the purification and hydrotreatment of these oils which can then be introduced into a steam cracker to obtain olefins and thus to re-produce polymers.

The process also makes it possible to obtain naphtha and/or diesel cuts from feedstock comprising plastics pyrolysis oils, cuts which the refiner could directly integrate respectively into the naphtha pool and/or into the diesel pool that are obtained by refining crude oil.

DESCRIPTION OF THE EMBODIMENTS

According to the invention, a "plastics pyrolysis oil" is an oil, advantageously in liquid form at ambient temperature, obtained from the pyrolysis of plastics, preferably of plastic waste notably originating from collection and sorting channels. It comprises in particular a mixture of hydrocarbon compounds, notably of paraffins, monoolefins and/or diolefins, or else optionally naphthenes and aromatics, these hydrocarbon compounds preferably having a boiling point of less than 700° C. and preferably less than 550° C. The plastics pyrolysis oil may also comprise, and usually does comprise, impurities such as metals, notably silicon and iron, and halogenated compounds, notably chlorinated compounds. These impurities may be present in the plastics pyrolysis oil in high contents, for example up to 350 ppm by weight or even 700 ppm by weight or even 1000 ppm by weight of halogen elements provided by halogenated compounds, up to 100 ppm by weight, or even 200 ppm by weight of metallic or semi-metallic elements. Alkali metals, alkaline-earth metals, transition metals, post-transition metals and metalloids may be likened to contaminants of metallic nature, referred to as metals or metallic or semi-metallic elements. In particular, the metals or metallic or semi-metallic elements that may be contained in the oils obtained from the pyrolysis of plastic waste comprise silicon, iron or both of these elements. The plastics pyrolysis oil may also comprise other impurities such as heteroelements provided notably by sulfur compounds, oxygen compounds and/or nitrogen compounds, in contents generally less than 10000 ppm by weight of heteroelements and preferably less than 4000 ppm by weight of heteroelements.

According to the present invention, the pressures are absolute pressures, also denoted abs., and are given in MPa absolute (or MPa abs.).

According to the present invention, the expressions "comprised between . . . and . . . " and "between . . . and . . . " are equivalent and mean that the limit values of the interval are included in the described range of values. If such were not the case and if the limit values were not included in the described range, such a clarification will be given by the present invention.

For the purposes of the present invention, the various ranges of parameters for a given step, such as the pressure ranges and the temperature ranges, may be used alone or in combination. For example, for the purposes of the present invention, a preferred range of pressure values can be combined with a more preferred range of temperature values.

In the text hereinbelow, particular embodiments of the invention may be described. They may be implemented separately or combined together without limitation of combination when this is technically feasible.

The invention relates to a process for treating a feedstock comprising a plastics pyrolysis oil, comprising the following steps:

a) a selective hydrogenation step advantageously carried out in a fixed bed wherein the feedstock and hydrogen are brought into contact in the presence of at least one selective hydrogenation catalyst, said selective hydrogenation being carried out at a temperature of between 100 and 250° C., preferably between 110 and 200° C., preferably between 130 and 180° C., a partial pressure of hydrogen of between 1.0 and 10.0 MPa abs., and an hourly space velocity of between 1.0 and 10.0 $h^{-1}$, advantageously in at least one reactor, preferably in at least two reactors and preferably, in two permutable reactors of the PRS (Permutable Reactor system) type, in series, so as to obtain at least one effluent with a reduced content of diolefins, also referred to as hydrogenated effluent;

b) a hydrotreatment step carried out in a fixed bed wherein the hydrogenated effluent from the selective hydrogenation step a) is brought into contact with hydrogen in the presence of at least one hydrotreatment catalyst, said step being carried out in at least one fixed-bed reactor, advantageously comprising n catalytic beds, n being an integer greater than or equal to 1, preferably between 2 and 10, preferably between 2 and 5, placed in series, at a temperature of between 250 and 430° C., preferably between 280 and 380° C., at a partial pressure of hydrogen of between 1.0 and 10.0 MPa abs. and at an hourly space velocity (HSV) between 0.1 and 10.0 $h^{-1}$, preferably between 0.1 and 5.0 $h^{-1}$, preferentially between 0.2 and 2.0 $h^{-1}$, preferably between 0.2 and 0.8 $h^{-1}$, an additional gaseous stream comprising hydrogen being advantageously introduced at the inlet of each catalytic bed from the second catalytic bed, so as to obtain at least one hydrotreatment effluent;

c) a step of separating the hydrotreatment effluent obtained from step b), comprising a washing/separation section fed with the hydrotreatment effluent obtained from step b) and advantageously an aqueous stream, said separation step being carried out at a temperature of between 50 and 370° C., preferentially between 100 and 340° C., preferably between 200 and 300° C., so as to obtain at least one gaseous effluent, one aqueous effluent and one hydrocarbon effluent.

The Feedstock

The feedstock of the process according to the invention comprises at least one plastics pyrolysis oil. Said feedstock may consist solely of plastics pyrolysis oil(s). Preferably, said feedstock comprises at least 50% by weight, preferably between 75% and 100% by weight, of plastics pyrolysis oil, i.e. preferably between 50% and 100% by weight and preferably between 70% and 100% by weight of plastics pyrolysis oil. The feedstock of the process according to the invention may comprise, inter alia, one or more plastics pyrolysis oils, a conventional petroleum-based feedstock, which is then co-treated with the plastics pyrolysis oil of the feedstock.

The plastics pyrolysis oil of said feedstock comprises hydrocarbon compounds, which are advantageously paraffinic, and impurities such as in particular mono- and/or diolefins, metals, notably silicon and iron, halogenated compounds, notably chlorinated compounds, heteroelements provided by sulfur-bearing compounds, oxygen-bearing compounds and/or nitrogen-bearing compounds. These impurities are often present in contents that are often high, for example up to 350 ppm by weight or even 700 ppm by weight or even 1000 ppm by weight of halogen elements provided by halogenated compounds, up to 100 ppm by weight, or even 200 ppm by weight of metallic or semi-metallic elements.

Said feedstock comprising a plastics pyrolysis oil may advantageously be pretreated in a pretreatment step $a_0$), prior to the selective hydrogenation step a), to obtain a pretreated feedstock which feeds step a). This pretreatment step $a_0$) makes it possible to reduce the amount of contaminants, in particular the amount of silicon, which may be present in the feedstock comprising a plastics pyrolysis oil. Thus, a step $a_0$) of pretreatment of the feedstock comprising a plastics pyrolysis oil is advantageously performed in particular when said feedstock comprises more than 50 ppm by weight, notably more than 20 ppm by weight, more particularly more than 10 ppm by weight, or even more than 5 ppm by weight of metallic elements, and in particular when said feedstock comprises more than 20 ppm by weight, more particularly more than 10 ppm by weight, or even more than 5 ppm by weight, of elements, and even more particularly more than 1.0 ppm by weight of silicon.

Said pretreatment step $a_0$) is performed prior to the selective hydrogenation step a), in an adsorption section fed with said feedstock comprising a plastics pyrolysis oil and operating at a temperature of between 0 and 150° C., preferably between 5 and 100° C., and at a pressure of between 0.15 and 10.0 MPa abs, preferably between 0.2 and 1.0 MPa abs, in the presence of at least one adsorbent, preferably of the alumina type, having a specific surface area of greater than or equal to 100 $m^2/g$, preferably greater than or equal to 200 $m^2/g$. The specific surface area of said at least one adsorbent is advantageously less than or equal to 600 $m^2/g$, in particular less than or equal to 400 $m^2/g$. The specific surface area of the adsorbent is a surface area measured by the BET method, i.e. the specific surface area determined by nitrogen adsorption in accordance with standard ASTM D 3663-78 established from the Brunauer-Emmett-Teller method described in the periodical *The Journal of the American Chemical Society*, 60, 309 (1938). Advantageously, said adsorbent comprises less than 1% by weight of metallic elements, and is preferably free of metallic elements. The term "metallic elements of the adsorbent" should be understood as referring to the elements from groups 6 to 10 of the Periodic Table of the Elements.

Said adsorption section comprises at least one adsorption column, preferably comprises two adsorption columns, containing said adsorbent. When the adsorption section comprises two adsorption columns, one operating mode may be that referred to as "swing", in which one of the columns is on-line while the other column is in reserve. When the absorbent in the on-line column is spent, this column is isolated, while the column in reserve is placed on-line. The spent absorbent may then be regenerated in situ and/or replaced with fresh absorbent, to be replaced on-line again when the other column has been isolated. Another operating mode is that of having the two columns operating in series; when the absorbent of the top column is spent, this first column is isolated and the spent absorbent is either regenerated in situ or replaced with fresh absorbent. The column is then brought back on-line in the second position, and so on. This operation is referred to as "lead and lag", according to the established term. The combination of two adsorption columns makes it possible to overcome the possible and potentially rapid poisoning and/or clogging of the adsorbent due to the combined action of the metallic contaminants, of the diolefins, of the gums obtained from the diolefins and of the insoluble matter that may be present in the plastics pyrolysis oil to be treated. The presence of two adsorption columns in fact facilitates the replacement and/or regeneration of the adsorbent, advantageously without stoppage of the pretreatment unit, or even of the process, thus making it possible to reduce the risks of clogging and thus to avoid stoppage of the unit due to clogging, to control the costs and to limit the consumption of adsorbent.

Selective Hydrogenation Step a)

According to the invention, the process comprises a selective hydrogenation step a) which is performed in the presence of hydrogen, under hydrogen pressure and temperature conditions such that they make it possible to maintain the liquid phase and with an amount of soluble hydrogen that is just necessary for selective hydrogenation of the diolefins present in the plastics pyrolysis oil. Selective hydrogenation of the diolefins in liquid phase thus makes it possible to avoid or at least to limit the formation of "gums", i.e. polymerization of the diolefins and thus the formation of oligomers and polymers, which can clog the reaction section of the subsequent hydrotreatment step. Said selective hydrogenation step a) makes it possible to obtain a hydrogenated effluent, i.e. an effluent with a reduced content of diolefins, or even free of diolefins.

According to the invention, said selective hydrogenation step a) is performed in a reaction section fed with said feedstock comprising a plastics pyrolysis oil, or with the pretreated feedstock obtained from the optional pretreatment step $a_0$), and a gaseous stream comprising hydrogen ($H_2$). Said reaction section involves selective hydrogenation, preferably in a fixed bed, in the presence of at least one selective hydrogenation catalyst, advantageously at a temperature of between 100 and 250° C., preferably between 110 and 200° C., preferably between 130 and 180° C., a partial pressure of hydrogen of between 1.0 and 10.0 MPa abs. and at an hourly space velocity (HSV) of between 1.0 and 10.0 $h^{-1}$. According to step a) of the process of the invention, the hourly space velocity (HSV) is defined as the ratio of the hourly volume flow rate of the feedstock comprising the plastics pyrolysis oil, which has optionally been pretreated, to the volume of catalyst(s). The amount of the gaseous stream feeding said reaction section of step a) is advantageously such that the hydrogen coverage is between 1 and 50 $Nm^3$ of hydrogen per $m^3$ of feedstock ($Nm^3/m^3$), and preferably between 5 and 20 $Nm^3$ of hydrogen per $m^3$ of feedstock ($Nm^3/m^3$). The hydrogen coverage is defined as the ratio of the volume flow rate of hydrogen taken under standard temperature and pressure conditions relative to the volume flow rate of feedstock at 15° C. (in normal $m^3$, written as $Nm^3$, of $H_2$ per $m^3$ of feedstock). The gaseous stream comprising hydrogen, which feeds the reaction section of step a), may consist of a supply of hydrogen and/or of recycled hydrogen obtained in particular from the separation step c).

Advantageously, the reaction section of said step a) comprises at least one reactor. Preferably, the reaction section comprises at least 2 reactors and, preferably, comprises two reactors which operate in a permutable system also called "PRS" for Permutable Reactor System. The combination of two "PRS" reactors makes it possible to isolate one reactor, to discharge the spent catalyst, to recharge the reactor with fresh catalyst and to return said reactor into service without stopping the process. The PRS technology is described in particular in patent FR2681871.

Advantageously, reactor inserts, for example of filter plate type, may be used to prevent the clogging of the reactor(s). An example of a filter plate is described in patent FR3051375.

Advantageously, said at least one selective hydrogenation catalyst comprises a support, preferably a mineral support, and a hydrodehydrogenating function.

The hydrodehydrogenating function comprises in particular at least one group VIII element, preferably chosen from the group consisting of nickel and cobalt, and/or at least one group VIB element, preferably chosen from the group consisting of molybdenum and tungsten. The total content of oxides of metallic elements from groups VIB and VIII (that is to say the sum of the metallic elements from groups VIB and VIII) is preferably between 1% and 40% by weight and preferentially from 5% to 30% by weight relative to the total weight of the catalyst. The weight ratio expressed as metal oxide between the group VIB metal(s) relative to the group VIII metal(s) is preferably between 1 and 20 and preferably between 2 and 10. For example, the reaction section of said step a) comprises a selective hydrogenation catalyst comprising between 0.5% and 10% by weight of nickel, preferably between 1% and 5% by weight of nickel (expressed as nickel oxide NiO relative to the weight of said catalyst), and between 1% and 30% by weight of molybdenum, preferably between 3% and 20% by weight of molybdenum (expressed as molybdenum oxide $MoO_3$ relative to the weight of said catalyst) on a support, preferably a mineral support.

The support for said at least one selective hydrogenation catalyst is preferably chosen from the group consisting of alumina, silica, silica-aluminas, magnesia, clays and mixtures thereof. Said support may also contain dopant compounds, notably oxides chosen from the group consisting of boron oxide, in particular boron trioxide, zirconia, ceria, titanium oxide, phosphorus pentoxide and a mixture of these oxides. Preferably, said at least one selective hydrogenation catalyst comprises an alumina support, preferably doped with phosphorus and optionally boron. When phosphorus pentoxide $P_2O_5$ is present, its concentration is less than 10% by weight relative to the weight of the alumina and advantageously at least 0.001% by weight relative to the total weight of the alumina. When boron trioxide $B_2O_3$ is present, its concentration is less than 10% by weight relative to the weight of the alumina and advantageously at least 0.001% relative to the total weight of the alumina. The alumina used can be a γ (gamma) or η (eta) alumina.

Said selective hydrogenation catalyst is, for example, in the form of extrudates.

Very preferably, at least one selective hydrogenation catalyst used in step a) comprises less than 1% by weight of nickel and at least 0.1% by weight of nickel, preferably 0.5% by weight of nickel, expressed as nickel oxide NiO relative to the weight of said catalyst, and less than 5% by weight of molybdenum and at least 0.1% by weight of molybdenum, preferably 0.5% by weight of molybdenum, expressed as molybdenum oxide $MoO_3$ relative to the weight of said catalyst, on an alumina support, this being in order to hydrogenate the diolefins as selectively as possible.

Optionally, the feedstock which comprises an optionally pretreated plastics pyrolysis oil can be mixed with the gaseous stream comprising hydrogen, prior to the reaction section.

Said feedstock, optionally mixed with the gaseous stream, can also be heated, for example by heat exchange, notably with the hydrotreatment effluent, before the reaction section so as to reach a temperature close to the temperature used in the reaction section that it feeds.

The content of impurities, in particular of diolefins, of the hydrogenated effluent obtained on conclusion of step a) is reduced relative to that of certain impurities, in particular to that of diolefins, included in the feedstock of the process. Step a) makes it possible to convert at least 90% and preferably at least 99% of the diolefins contained in the initial feedstock. Step a) also makes it possible to remove, at least partly, other contaminants, for instance silicon. The hydrogenated effluent is preferably sent directly to the hydrotreatment step b).

Hydrotreatment Step b)

According to the invention, the treatment process comprises a step b) of hydrotreatment, advantageously in a fixed bed, of said hydrogenated effluent obtained from step a) in the presence of hydrogen and of at least one hydrotreatment catalyst, to obtain a hydrotreatment effluent.

Advantageously, said step b) is performed in a hydrotreatment reaction section comprising a fixed-bed reactor containing n catalytic beds, n being an integer greater than or equal to 1, preferably between 2 and 10, preferably between 2 and 5, placed in series and each comprising at least one hydrotreatment catalyst. Said reaction section is fed, advantageously at the first catalytic bed, with said hydrogenated effluent obtained from step a) and a gaseous stream comprising hydrogen.

Advantageously, said hydrotreatment reaction section is implemented at a pressure equivalent to that used in the reaction section of the selective hydrogenation step a), but at a higher temperature than that of the reaction section of the selective hydrogenation step a). Thus, said hydrotreatment reaction section is advantageously implemented at a temperature of between 250 and 430° C., preferably between 280 and 380° C., at a partial pressure of hydrogen of between 1.0 and 10.0 MPa abs., and at an hourly space velocity (HSV) of between 0.1 and 10.0 $h^{-1}$, preferably between 0.1 and 5.0 $h^{-1}$, preferentially between 0.2 and 2.0 $h^{-1}$, preferably between 0.2 and 0.8 $h^{-1}$. According to step b) of the process of the invention, the hourly space velocity (HSV) is defined as the ratio of the hourly volume flow rate of the hydrogenated effluent obtained from step a) to the volume of catalyst(s). The hydrogen coverage in step b) is advantageously between 50 and 1000 $Nm^3$ of hydrogen per $m^3$ of hydrogenated effluent obtained from step a), preferably between 50 and 500 $Nm^3$ of hydrogen per $m^3$ of hydrogenated effluent obtained from the selective hydrogenation step a), preferably between 100 and 300 $Nm^3$ of hydrogen per $m^3$ of hydrogenated effluent obtained from the selective hydrogenation step a). The hydrogen coverage is defined in this case as the ratio of the volume flow rate of hydrogen taken under standard temperature and pressure conditions relative to the volume flow rate of hydrogenated effluent obtained from step a) (in normal $m^3$, written as $Nm^3$, of $H_2$ per $m^3$ of hydrogenated effluent obtained from step a)). The hydrogen may consist of a supply and/or of recycled hydrogen obtained in particular from the separation step c).

Preferably, an additional gaseous stream comprising hydrogen is advantageously introduced, at the inlet of each catalytic bed, from the second catalytic bed. These additional gaseous streams are also referred to as cooling streams. They make it possible to control the temperature in the hydrotreatment reactor in which the reactions involved are generally highly exothermic.

Advantageously, said at least one hydrotreatment catalyst used in said step b) may be chosen from known hydrodemetallation, hydrotreatment or silicon scavenging catalysts notably used for the treatment of petroleum cuts, and combinations thereof. Known hydrodemetallation catalysts are, for example, those described in the patents EP 0113297, EP 0113284, U.S. Pat. Nos. 5,221,656, 5,827,421, 7,119,045, 5,622,616 and 5,089,463. Known hydrotreatment catalysts are, for example, those described in the patents EP 0113297, EP 0113284, U.S. Pat. Nos. 6,589,908, 4,818,743 or 6,332,976. Known silicon scavenging catalysts are, for example, those described in the patent applications CN 102051202 and US 2007/080099.

In particular, said at least one hydrotreatment catalyst comprises a support, preferably a mineral support, and at least one metallic element having a hydrodehydrogenating function. Said at least one metallic element having a hydrodehydrogenating function advantageously comprises at least one group VIII element, preferably chosen from the group consisting of nickel and cobalt, and/or at least one group VIB element, preferably chosen from the group consisting of molybdenum and tungsten. The total content of oxides of metallic elements from groups VIB and VIII is preferably between 1% and 40% by weight and preferentially from 5% to 30% by weight relative to the total weight of the catalyst. The weight ratio expressed as metal oxide between the group VIB metal(s) relative to the group VIII metal(s) is preferably between 1.0 and 20 and preferably between 2.0 and 10. For example, the hydrotreatment reaction section of step b) of the process comprises a hydrotreatment catalyst comprising between 0.5% and 10% by weight of nickel, preferably between 1% and 5% by weight of nickel, expressed as nickel oxide NiO relative to the total weight of the hydrotreatment catalyst, and between 1.0% and 30% by weight of molybdenum, preferably between 3.0% and 20% by weight of molybdenum, expressed as molybdenum oxide $MoO_3$ relative to the total weight of the hydrotreatment catalyst, on a mineral support.

The support for said at least one hydrotreatment catalyst is advantageously chosen from the group consisting of alumina, silica, silica-aluminas, magnesia, clays and mixtures thereof. Said support may also contain dopant compounds, notably oxides chosen from the group consisting of boron oxide, in particular boron trioxide, zirconia, ceria, titanium oxide, phosphorus pentoxide and a mixture of these oxides. Preferably, said at least one hydrotreatment catalyst comprises an alumina support, preferably an alumina support doped with phosphorus and optionally boron. When phosphorus pentoxide $P_2O_5$ is present, its concentration is less than 10% by weight relative to the weight of the alumina and advantageously at least 0.001% by weight relative to the total weight of the alumina. When boron trioxide $B_2O_3$ is present, its concentration is less than 10% by weight relative to the weight of the alumina and advantageously at least 0.001% relative to the total weight of the alumina. Alumina. The alumina used can be a γ (gamma) or η (eta) alumina.

Said hydrotreatment catalyst is, for example, in the form of extrudates.

Advantageously, said at least one hydrotreatment catalyst used in step b) of the process has a specific surface area of greater than or equal to 250 $m^2/g$, preferably greater than or equal to 300 $m^2/g$. The specific surface area of said hydrotreatment catalyst is advantageously less than or equal to 800 $m^2/g$, preferably less than or equal to 600 $m^2/g$, in particular less than or equal to 400 $m^2/g$. The specific surface area of the hydrotreatment catalyst is measured by the BET method, i.e. the specific surface area determined by nitrogen adsorption in accordance with standard ASTM D 3663-78 established from the Brunauer-Emmett-Teller method described in the periodical *The Journal of the American Chemical Society*, 60, 309 (1938). Such a specific surface area makes it possible to further improve the removal of the contaminants, in particular of the metals such as silicon.

Optionally, step b) may involve a heating section located upstream of the hydrotreatment reaction section and wherein the hydrogenated effluent obtained from step a) is heated to reach a temperature suitable for the hydrotreatment, i.e. a temperature of between 250 and 370° C. Said optional heating section may thus comprise one or more exchangers, preferably allowing heat exchange between the hydrogenated effluent and the hydrotreatment effluent, and/or a preheating furnace.

Advantageously, the hydrotreatment step b) allows total hydrogenation of the olefins present in the initial feedstock and those that may be obtained after the selective hydrogenation step a), but also the at least partial conversion of other impurities present in the feedstock, such as the aromatic compounds, the metal compounds, the sulfur compounds, the nitrogen compounds, the halogen compounds (notably the chlorine compounds) and the oxygen compounds. Step b) may also make it possible to further reduce the content of contaminants, such as that of the metals, in particular the silicon content.

Separation Step c)

According to the invention, the treatment process comprises a separation step c), advantageously performed in at least one washing/separation section, fed at least with the hydrotreatment effluent obtained from step b), to obtain at least one gaseous effluent, an aqueous effluent and a hydrocarbon effluent.

The gaseous effluent advantageously comprises hydrogen, preferably comprises essentially hydrogen, that is to say comprises at least 90% by volume, preferably at least 95% by volume, preferably at least 99% by volume, of hydrogen. Advantageously, said gaseous effluent, which preferably contains essentially hydrogen, may be at least partly recycled into the selective hydrogenation step a) and/or the hydrotreatment step b), the recycling system possibly comprising a purification section. The aqueous effluent advantageously comprises ammonium salts and/or hydrochloric acid. Said hydrocarbon effluent comprises hydrocarbon compounds and advantageously corresponds to the plastics pyrolysis oil of the feedstock, or to the plastics pyrolysis oil and the fraction of conventional petroleum-based feedstock co-treated with the pyrolysis oil, freed at least in part of its impurities, in particular from its olefinic (di- and monoolefins), metallic impurities, halogenated impurities.

This separation step c) in particular makes it possible to remove the ammonium chloride salts which form by reaction between the chloride ions, released by hydrogenation of the chlorinated compounds during step b), and the ammonium ions, generated by hydrogenation of the nitrogen-bearing compounds during step b) and/or provided by injection of an amine, and thus to limit the risks of clogging, in particular in the transfer lines and/or in the sections of the process of the invention and/or the transfer lines to the steam cracker, due to the precipitation of the ammonium chloride salts. It also makes it possible to remove the hydrochloric acid formed by the reaction of the hydrogen ions and the chloride ions.

Depending on the content of chlorinated compounds in the initial feedstock to be treated, an amine stream may be injected upstream of the selective hydrogenation step a), between the selective hydrogenation step a) and the hydrotreatment step b) and/or between the hydrotreatment step b) and the separation step c), preferably upstream of the selective hydrogenation step a), so as to ensure a sufficient amount of ammonium ions to combine with the chloride ions formed during the hydrotreatment step, thus making it possible to limit the formation of hydrochloric acid and thus to limit corrosion downstream of the separation section.

Advantageously, the separation step c) comprises injection of an aqueous solution into the hydrotreatment effluent obtained from step b), upstream of the washing/separation section, so as to at least partly dissolve the ammonium chloride salts and/or the hydrochloric acid and thus to improve the removal of the chlorinated impurities and to reduce the risks of clogging caused by accumulation of the ammonium chloride salts.

The separation step c) is advantageously performed between 50 and 370° C., preferentially between 100 and 340° C., preferably between 200 and 300° C. Advantageously, the separation step c) is performed at a pressure close to that used in steps a) and/or b), so as to facilitate the recycling of hydrogen.

The washing/separation section of step c) may be at least partly performed in common or separate washing and separation equipment, this equipment being well known (separating vessels which may be operated at various pressures and temperatures, pumps, heat exchangers, washing columns, etc.).

In an optional embodiment of the invention, taken in addition with or separately from other described embodiments of the invention, the separation step c) comprises the injection of an aqueous solution into the hydrotreatment effluent obtained from step b), followed by the washing/separation section advantageously comprising a separation phase for obtaining at least one aqueous stream charged with ammonium salts, a washed liquid hydrocarbon stream and a partially washed gaseous stream. The aqueous stream charged with ammonium salts and the washed liquid hydrocarbon stream may subsequently be separated in a decanting vessel so as to obtain said hydrocarbon effluent and said aqueous effluent. Said partially washed gaseous stream may, in parallel, be introduced into a washing column where it circulates counter-currentwise relative to an aqueous stream, preferably of the same nature as the aqueous solution injected into the hydrotreatment effluent, which makes it possible to at least partly, and preferably totally, remove the hydrochloric acid contained in the partially washed gaseous stream and thus to obtain said gaseous effluent, preferably essentially comprising hydrogen, and an acidic aqueous stream. Said aqueous effluent obtained from the decanting vessel may optionally be mixed with said acidic aqueous stream, and be used, optionally as a mixture with said acidic aqueous stream, in a water recycling circuit to feed step c) of separation into said aqueous solution upstream of the washing/separation section and/or into said aqueous stream in the washing column. Said water recycling circuit may include a supply of water and/or of a basic solution and/or a purge for removing the dissolved salts.

In another optional embodiment of the invention, taken separately or in combination with other described embodiments of the invention, the separation step c) may advantageously comprise a "high-pressure" washing/separation section which operates at a pressure close to the pressure of the selective hydrogenation step a) and/or of the hydrotreatment step b), so as to facilitate the recycling of hydrogen. This optional "high-pressure" section of step c) may be completed with a "low-pressure" section, so as to obtain a hydrocarbon liquid fraction free of a portion of the gases dissolved at high pressure and intended to be treated directly in a steam cracking process or optionally to be sent into the fractionation step d).

The hydrocarbon effluent obtained from the separation step c) is sent either directly to the inlet of a steam cracking unit, or into an optional fractionation step d). Preferably, the hydrocarbon liquid effluent is sent into a fractionation step d).

Fractionation Step d) (Optional)

The process according to the invention may comprise, preferably comprises, a step of fractionating the hydrocarbon effluent, to obtain at least one gaseous stream and at least two hydrocarbon streams having boiling points different than one another. Said fractionation step d) can for example make it possible to obtain a naphtha cut with a boiling point below 150° C., in particular between 80 and 150° C., and a hydrocarbon cut with a boiling point above 150° C., or a naphtha cut with a boiling point below 150° C., in particular between 80 and 150° C., a diesel cut with a boiling point between 150° C. and 385° C., and a hydrocarbon cut with a boiling point above 385° C., termed heavy hydrocarbon cut.

When it is present, step d) makes it possible, notably under the action of a stream of water vapor, in particular to remove the gases dissolved in the hydrocarbon liquid effluent, for instance ammonia, hydrogen sulfide and light hydrocarbons containing 1 to 4 carbon atoms.

The optional fractionation step d) is advantageously performed at a pressure of less than or equal to 1.0 MPa abs., preferably between 0.1 and 1.0 MPa abs. Step d) can be performed in a section comprising a stripping column equipped with a reflux circuit comprising a reflux vessel. Said stripping column is fed with the hydrocarbon liquid effluent obtained from step c) and with a steam stream. The hydrocarbon liquid effluent obtained from step c) may optionally be heated before entering the stripping column. Thus, the lightest compounds are entrained to the top of the column and into the reflux circuit comprising a reflux vessel wherein a gas/liquid separation is performed. The gaseous phase which comprises the light hydrocarbons is withdrawn from the reflux vessel as a gaseous stream. At least one fraction of the liquid phase is advantageously withdrawn from the reflux vessel, in a hydrocarbon stream with a relatively low boiling point, for example a naphtha cut with a boiling point of less than 150° C. A hydrocarbon stream, which is advantageously liquid, with a higher boiling point than the hydrocarbon stream withdrawn at the top of the column, for example greater than 150° C., is withdrawn at the bottom of the stripping column.

According to other embodiments, the fractionation step d) may involve a stripping column followed by a distillation column or only a distillation column.

Said hydrocarbon streams, for example the naphtha cut with a boiling point of less than 150° C. and the cut with a boiling point of greater than 150° C., which are optionally mixed, may be sent to a steam cracking unit, at the outlet of which olefins may be (re)formed to participate in the formation of polymers. The naphtha stream, for example with a boiling point of less than 150° C., can, according to another mode, be sent to a naphtha pool, that is to say to the naphtha effluents, resulting from more conventional petroleum-based feedstocks, produced in the same refinery in which the process according to the invention is performed, the hydrocarbon stream with a boiling point of greater than 150° C. being for its part sent to a steam cracking unit. If optional step d) leads to the obtaining of a naphtha cut (in particular with a boiling point of less than 150° C.), a diesel cut (in particular with a boiling point between 150° C. and 385° C.) and a heavy cut (in particular with a boiling point of greater than 385° C.), the naphtha cut can be sent to the naphtha pool produced in the same refinery and the diesel cut can also be sent either to a steam cracking unit with the heavy cut, or to a diesel pool produced in the refinery.

According to one or more preferred embodiments of the invention, taken separately or combined, the process for treating a feedstock comprising a plastics pyrolysis oil comprises, and preferably consists of, the sequence of steps described above, preferably in the given order, i.e.: the pretreatment step $a_0$), the selective hydrogenation step a), the hydrotreatment step b), the separation step c) and optionally the fractionation step d), to produce a treated plastics pyrolysis oil having a composition compatible with entry into a steam cracking unit.

Said hydrocarbon effluent or, when the process according to the invention comprises a fractionation step, said hydrocarbon streams having boiling points different than one another, thus obtained by treatment, according to the process of the invention, of a plastics pyrolysis oil, has (have) a composition that is compatible with the specifications for a feedstock entering a steam cracking unit. In particular, the composition of the hydrocarbon effluent or of said hydrocarbon streams is preferably such that:
  the total content of metallic elements is less than or equal to 5.0 ppm by weight, preferably less than or equal to 2.0 ppm by weight, preferentially less than or equal to 1.0 ppm by weight and preferably less than or equal to 0.5 ppm by weight, with:
    a content of silicon element (Si) of less than or equal to 1.0 ppm by weight, preferably less than or equal to 0.6 ppm by weight, and
    a content of iron element (Fe) of less than or equal to 100 ppb by weight,
  the sulfur content is less than or equal to 500 ppm by weight, preferably less than or equal to 200 ppm by weight,
  the nitrogen content is less than or equal to 500 ppm by weight, preferably less than or equal to 200 ppm by weight,
  the asphaltene content is less than or equal to 5.0 ppm by weight,
  the total content of chlorine element is less than or equal to 50 ppb by weight,
  the content of olefinic compounds (monoolefins and diolefins) is less than or equal to 5.0% by weight, preferably less than or equal to 2.0% by weight and preferably less than or equal to 0.5% by weight.

The contents are given as relative weight concentrations, weight percentages (%), parts per million (ppm) by weight or parts per billion (ppb) by weight, relative to the total weight of the stream under consideration.

The process according to the invention thus makes it possible to treat the plastics pyrolysis oils to obtain an effluent which can be injected into a steam cracking unit. The process according to the invention thus makes it possible to upgrade the plastics pyrolysis oils, while at the same time reducing coke formation and thus the risks of clogging and/or of premature loss of activity of the catalyst(s) used in the steam cracking unit, and reducing the corrosion risks.

Steam Cracking Step e) (Optional)

The hydrocarbon effluent obtained from the separation step c), or at least one of the two hydrocarbon streams obtained from the optional step d), may be sent to a steam cracking step e).

Said steam cracking step e) is advantageously performed in at least one pyrolysis furnace at a temperature of between 700 and 900° C., preferably between 750 and 850° C., and at a pressure of between 0.05 and 0.3 MPa relative. The residence time of the hydrocarbon compounds is generally less than or equal to 1.0 second (noted as s), preferably between 0.1 and 0.5 s. Steam is advantageously introduced upstream of the optional steam cracking step e) and after the separation (or the fractionation). The amount of water introduced, advantageously in the form of steam, is between 0.3 and 3.0 kg of water per kg of hydrocarbon compounds entering step e). The optional step e) is preferably performed in a plurality of pyrolysis furnaces in parallel, so as to adapt the operating conditions to the various streams feeding step e) and notably obtained from step d), and also to manage the tube decoding times. A furnace comprises one or more tubes arranged in parallel. A furnace may also denote a group of furnaces operating in parallel. For example, one furnace can be dedicated to the cracking of a hydrocarbon stream comprising compounds with a boiling point of less than 150° C., in particular between 80 and 150° C., and another furnace dedicated to the hydrocarbon stream comprising compounds with a boiling point of greater than 150° C.

This steam cracking step e) makes it possible to obtain at least one effluent, in particular one effluent per hydrocarbon stream sent to the steam cracking step e), containing olefins comprising 2, 3 and/or 4 carbon atoms (i.e. C2, C3 and/or C4 olefins), in satisfactory contents, in particular greater than or equal to 30% by weight, notably greater than or equal to 40% by weight, or even greater than or equal to 50% by weight of total olefins comprising 2, 3 and 4 carbon atoms relative to the weight of the steam cracking effluent under consideration. Said C2, C3 and C4 olefins may then be advantageously used as polyolefin monomers.

According to one or more preferred embodiments of the invention, taken separately or combined, the process for treating a feedstock comprising a plastics pyrolysis oil comprises, and preferably consists of, the sequence of steps described above, and preferably in the given order, i.e.: the pretreatment step $a_0$), the selective hydrogenation step a), the hydrotreatment step b), the separation step c), optionally the fractionation step d), and the steam cracking step e).

The process according to the invention, when it comprises this steam cracking step e), thus makes it possible to obtain from plastics pyrolysis oils, for example plastic waste, olefins that can serve as monomers for the synthesis of new polymers, in relatively satisfactory yields, without clogging or corrosion of the units.

The figures and examples that follow illustrate the invention without limiting the scope thereof.

Analysis Methods Used

The analysis methods and/or standards used for determining the characteristics of the various streams, in particular of the feedstock to be treated and of the effluents, are known to those skilled in the art. They are in particular listed below:

| Characteristics | Methods |
| --- | --- |
| Volume mass@15° C. | ASTM D4052 |
| Sulfur content | ISO 20846 |
| Nitrogen content | ASTM D4629 |
| Acid number | ASTM DS64 |
| Bromine content | ASTM D1159 |
| Diolefin content from the Maleic Anhydride number | MAV Method as described in the article: C. López-García et al., Near Infrared Monitoring of Low Conjugated Diolefins Content in Hydrotreated FCC Gasoline Streams, Oil & Gas Science and Technology - Rev. IFP, Vol. 62 (2007), No. 1, 57-68 |
| Oxygen-bearing compound content | Combustion + Infrared |
| Paraffin Content | UOP990-11 |
| Naphthene Content | UOP990-11 |
| Olefin Content | UOP990-11 |
| Aromatic compound Content | UOP990-11 |
| Halogen Content | ASTM-D7359 |
| Asphaltene Content | IFP9313 |
| Chlorine Content | ASTM D7536 |
| Metal Content: | |
| P | ASTM-D5185 |
| Fe | |
| Si | |
| Na | |
| B | |
| Simulated Distillation | ASTM D2887 |

LIST OF FIGURES

The information regarding the elements referenced in FIGS. 1 to 3 enables a better understanding of the invention, without said invention being limited to the particular embodiments illustrated in FIGS. 1 to 3. The various embodiments presented may be used alone or in combination with each other, without any limitation to the combination.

FIG. 1 represents the scheme of one embodiment of the process of the present invention, comprising:
- a step a) of selective hydrogenation of a hydrocarbon feedstock obtained from the pyrolysis of plastics 1, in the presence of a hydrogen-rich gas 2 and optionally of an amine supplied by the stream 3, performed in at least one fixed-bed reactor including at least one selective hydrogenation catalyst, to obtain an effluent 4;
- a step b) of hydrotreatment of the effluent 4 obtained from step a), in the presence of hydrogen 5, performed in at least one fixed-bed reactor including at least one hydrotreatment catalyst, to obtain a hydrotreated effluent 6;
- a step c) of separation of the effluent 6 performed in the presence of an aqueous washing solution 7, making it possible to obtain at least one fraction 8 comprising hydrogen, an aqueous fraction 9 containing dissolved salts, and a hydrocarbon liquid fraction 10.

Instead of injecting the amine stream 3 into the inlet of the selective hydrogenation step a), it is possible to inject it into the inlet of the hydrotreatment step b), into the inlet of the separation step c), or else not to inject it, depending on the characteristics of the feedstock.

FIG. 2 is a variant of the implementation of the process according to the invention represented in FIG. 1. In the embodiment shown in FIG. 2, the hydrocarbon liquid fraction 10, obtained at the end of step c), is sent to a fractionation step d) making it possible to obtain at least one gaseous fraction 11, a fraction comprising naphtha 12 and a hydrocarbon fraction 13.

FIG. 3 is a variant of the implementation of the process according to the invention represented in FIG. 2. In the embodiment shown in FIG. 3, the hydrocarbon feedstock obtained from the pyrolysis of plastics 1 undergoes a step pretreatment $a_0$), prior to the selective hydrogenation step a). The feedstock then pretreated 14 feeds the selective hydrogenation step a).

Figure 1:
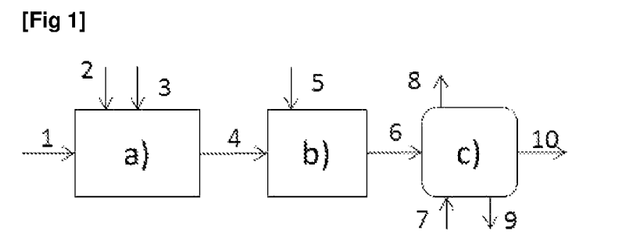
Figure 2:
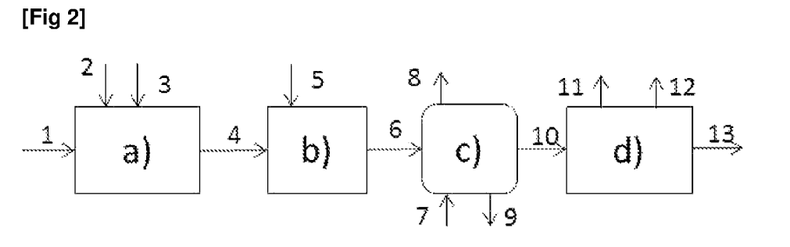
Figure 3:
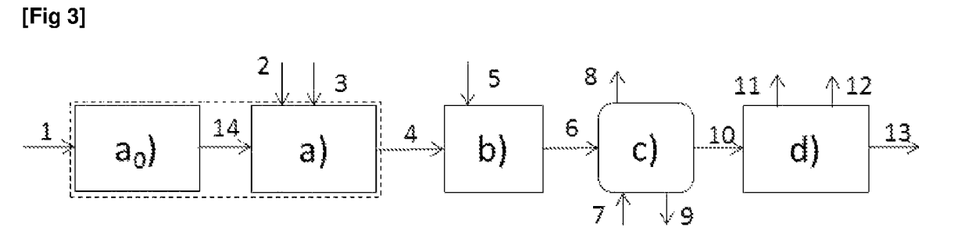

Only the main steps, with the main streams, are shown in FIGS. 1 to 3, so as to allow a better understanding of the invention. It is clearly understood that all the equipment required for the functioning is present (vessels, pumps, exchangers, furnaces, columns, etc.), even if it is not shown. It is also understood that hydrogen-rich gaseous streams (supply or recycle), as described above, may be injected into the inlet of each reactor or catalytic bed or between two reactors or two catalytic beds. Means well known to those skilled in the art for purifying and for recycling hydrogen may also be used.

At the end of step d), the fraction comprising naphtha 12 and/or the hydrocarbon fraction 13 is/are sent to a steam cracking process.

EXAMPLES

Example 1 (in Accordance with the Invention)

The feedstock treated in the process is a plastics pyrolysis oil (i.e. comprising 100% by weight of said plastics pyrolysis oil) having the characteristics indicated in table 2.

TABLE 2 feedstock characteristics

| Description/ | Methods | Unit | Pyrolysis oil |
|---|---|---|---|
| Volume mass @ 15° C. | ASTM D4052 | g/cm³ | 0.820 |
| Sulfur content | ISO 20846 | ppm by weight | 2500 |
| Nitrogen content | ASTM D4629 | ppm by weight | 730 |
| Acid number | ASTM D664 | mgKOH/g | 1.5 |
| Bromine content | ASTM D1159 | g/100 g | 80 |
| Diolefin content from the Maleic Anhydride number | MAV Method[1] | % by weight | 10 |
| Oxygen-bearing compound content | Combustion + Infrared | % by weight | 1.0 |
| Paraffin content | UOP990-11 | % by weight | 45 |
| Naphthene content | UOP990-11 | % by weight | 20 |
| Olefin content | UOP990-11 | % by weight | 25 |
| Aromatic compound content | UOP990-11 | % by weight | 10 |
| Halogen content | ASTM-D7359 | ppm by weight | 350 |
| Asphaltene content | IFP9313 | ppm by weight | 380 |
| Chlorine content | ASTM D7536 | ppm by weight | 320 |
| Metal content: | | | |
| P | ASTM-D5185 | ppm by weight | 10 |
| Fe | | ppm by weight | 25 |
| Si | | ppm by weight | 45 |
| Na | | ppm by weight | 2 |
| B | | ppm by weight | 2 |
| Simulated distillation: | | | |
| 0% | ASTM D2887 | ° C. | 40 |
| 10% | | ° C. | 98 |
| 30% | | ° C. | 161 |
| 50% | | ° C. | 232 |
| 70% | | ° C. | 309 |
| 90% | | ° C. | 394 |
| 100% | | ° C. | 432 |

[1]MAV method described in the article: C. López-García et al., Near Infrared Monitoring of Low Conjugated Diolefins Content in Hydrotreated FCC Gasoline Streams, Oil & Gas Science and Technology - Rev. IFP, Vol. 62 (2007), No. 1, pp. 57-68

The feedstock 1 is subjected to a selective hydrogenation step a) performed in a fixed-bed reactor and in the presence of hydrogen 2 and of a selective hydrogenation catalyst of the NiMo type on alumina, under the conditions indicated in table 3.

TABLE 3 conditions of the selective hydrogenation step a)

| | | |
|---|---|---|
| Temperature | ° C. | 150 |
| Partial pressure of hydrogen | MPa abs | 6.4 |
| H₂/HC (volume coverage of hydrogen relative to the feedstock volume) | Nm³/m³ | 10 |
| HSV (volume flow rate of feedstock/ volume of catalysts) | h⁻¹ | 6 |

On conclusion of the selective hydrogenation step a), all of the diolefins initially present in the feedstock were converted.

The effluent 4 obtained from the selective hydrogenation step a) is subjected directly, without separation, to a hydrotreatment step b) performed in a fixed bed in the presence of hydrogen 5 and of a hydrotreatment catalyst of NiMo type on alumina under the conditions presented in Table 4.

TABLE 4 conditions of the hydrotreatment step b)

| | | |
|---|---|---|
| Hydrotreatment temperature | ° C. | 355 |
| Partial pressure of hydrogen | MPa abs | 6.2 |

TABLE 4-continued conditions of the hydrotreatment step b)

| | | |
|---|---|---|
| H₂/HC (volume coverage of hydrogen relative to the feedstock volume) | Nm³/m³ | 300 |
| HSV (volume flow rate of feedstock/ volume of catalysts) | h⁻¹ | 0.5 |

The effluent 6 obtained from the hydrotreatment step b) is subjected to a separation step c): a stream of water is injected into the effluent obtained from the hydrotreatment step b); the mixture is then treated in an acid gas washing column and separating vessels. The liquid effluent obtained is then sent to a fractionation step d) which comprises a stripping column. The yields for the various fractions obtained after separation and fractionation are indicated in table 5 (the yields being corresponding to the ratios of the mass amounts of the various products obtained relative to the mass of feedstock upstream of step a), expressed in percentage and noted as % m/m).

TABLE 5 yields of the various products obtained after separation and fractionation

| | | |
|---|---|---|
| NH₃ + H₂S | % m/m | 0.35 |
| C1-C4 Fraction | % m/m | 0.50 |
| PI– 150° C. Fraction | % m/m | 28.10 |
| 150° C.+ Fraction | % m/m | 71.40 |
| PI+ Fraction | % m/m | 99.50 |

The characteristics of the PI-150° C. and 150° C.+ liquid fractions (and also the PI+ fraction which is the sum of the PI-150° C. and 150° C.+ fractions) obtained after the separation step c) and a fractionation step are presented in table 6:

TABLE 6 characteristics of the PI– 150° C, 150° C.+ and PI+ fractions

| Analysis (method) | | Fraction PI– 150° C. | Fraction 150° C.+ | Fraction PI+ |
|---|---|---|---|---|
| Volume mass @ 15° C. (ASTM D4052) | g/cm³ | 0.750 | 0.827 | 0.804 |
| Content of: | | | | |
| Sulfur (ASTM D5453) | ppm by weight | <2 | <10 | <10 |
| Nitrogen (ASTM D4629) | ppm by weight | <0.5 | <5 | <5 |
| Fe (ASTM D5185) | ppb by weight | Not detected | <50 | <50 |
| Total metals (ASTM D5185) | ppm by weight | Not detected | <1 | <1 |
| Chlorine (ASTM D7536) | ppb by weight | Not detected | <25 | <25 |
| Paraffins (UOP990-11) | % by weight | 68 | 65 | 66 |
| Naphthenes (UOP990-11) | % by weight | 30.5 | 33 | 32 |
| Olefins (UOP990-11) | % by weight | not detected | not detected | not detected |
| Aromatic compounds (UOP990-11) | % by weight | 1.5 | 2 | 2 |
| Simulated Distillation (ASTM D2887) | | | | |
| 0% | ° C. | 25 | 150 | 25 |
| 5% | ° C. | 32 | 162 | 53 |
| 10% | ° C. | 40 | 174 | 92 |
| 30% | ° C. | 82 | 226 | 155 |
| 50% | ° C. | 108 | 281 | 227 |
| 70% | ° C. | 126 | 346 | 305 |
| 90% | ° C. | 142 | 395 | 391 |
| 95% | ° C. | 146 | 404 | 398 |
| 100% | ° C. | 150 | 432 | 432 |

The liquid fractions PI-150° C. and 150° C.+ both have compositions that are compatible with a steam cracking unit, since:
- they do not contain any olefins (monoolefins and diolefins);
- they have very low contents of chlorine element (respectively, an undetected content and a content of 25 ppb by weight), which are below the limit required for a steam cracking feedstock (≤50 ppb by weight);
- the contents of metals, in particular of iron (Fe), are also very low (contents of metals not detected for the PI-150° C. fraction and <1 ppm by weight for the 15000+ fraction; contents of Fe not detected for the PI-150° C. fraction and of 50 ppb by weight for the 150° C.+ fraction), which are below the limits required for a steam cracking feedstock (≤5.0 ppm by weight, very preferably ≤1 ppm by weight for metals; ≤100 ppb by weight for Fe);
- finally, they contain sulfur (<2 ppm by weight for the PI-150° C. fraction and <10 ppm by weight for the 150° C.+ fraction) and nitrogen (<0.5 ppm by weight for the PI-150° C. fraction and <5 ppm by weight for the 150° C.+ fraction) with contents that are very much lower than the limits required for a steam cracking feedstock (s 500 ppm by weight, preferably s 200 ppm by weight for S and N).

It also appears that the mixture of the two liquid fractions, named PI+, also has very low contents of olefins and of contaminants (in particular of metals, chlorine, sulfur, nitrogen) making the composition compatible with a steam cracking unit.

The liquid fractions PI-150° C. and 150° C.+ obtained are thus then sent into a steam cracking step where the liquid fractions are cracked under various conditions (cf. Table 7). The PI+ mixture can also be sent directly into a steam cracking step under the conditions mentioned in table 7.

TABLE 7 conditions of the steam cracking step

| Pressure at furnace exit | MPa abs | 0.2 |
|---|---|---|
| Temperature at furnace exit of PI– 150° C. fractions | ° C. | 800 |
| Temperature at furnace exit of 150° C.+ fraction | ° C. | 790 |
| Temperature at furnace exit of PI+ fractions | ° C. | 795 |
| Steam fraction/PI– 150° C.+ fraction ratio | kg/kg | 0.6 |
| Steam/150° C.+ fraction ratio | kg/kg | 0.8 |
| Steam/PI+ fractions ratio | kg/kg | 0.7 |
| Furnace residence time of PI– 150° C. fractions | s | 0.3 |
| Furnace residence time of 150° C.+ fractions | s | 0.3 |
| Furnace residence time of PI+ fractions | s | 0.3 |

The effluents from the various steam cracking furnaces are subjected to a separation step which enables recycling of the saturated compounds into the steam cracking furnaces and the production of the yields presented in Table 8 (yield=mass % of product relative to the mass of each of the fractions upstream of the steam cracking step, noted as % m/m).

TABLE 8

Yields of the steam cracking step

| Fractions | | PI– 150° C. Fraction | 150° C.+ Fraction | PI+ Fraction |
|---|---|---|---|---|
| H2, CO, C1 | % m/m | 7.8 | 7.9 | 8.1 |
| Ethylene | % m/m | 33.7 | 34.2 | 34.8 |
| Propylene | % m/m | 18.3 | 18.6 | 19.0 |
| C4 cut | % m/m | 14.6 | 14.8 | 15.1 |

TABLE 8-continued

Yields of the steam cracking step

| Fractions | | PI– 150° C. Fraction | 150° C.+ Fraction | PI+ Fraction |
|---|---|---|---|---|
| Pyrolysis gasoline | % m/m | 19.8 | 19.4 | 18.8 |
| Pyrolysis oil | % m/m | 5.7 | 5.1 | 4.2 |

By considering the yields obtained for the various liquid fractions PI-150° C. and 150° C.+(and their PI+ mixture) during the pyrolysis oil treatment process (see table 5), it is possible to determine the overall yields for the products obtained from the steam cracking step relative to the initial feedstock of plastics pyrolysis oil type introduced into step a):

TABLE 9 overall yields for the process followed by the steam cracking step

| Fractions | | PI– 150° C. Fraction | 150° C.+ Fraction | PI+ Fraction |
|---|---|---|---|---|
| H2, CO, C1 | % m/m | 2.2 | 5.6 | 8.0 |
| Ethylene | % m/m | 9.5 | 24.4 | 34.7 |
| Propylene | % m/m | 5.2 | 13.3 | 18.9 |
| C4 cut | % m/m | 4.1 | 10.6 | 15.1 |
| Pyrolysis gasoline | % m/m | 5.6 | 13.9 | 18.7 |
| Pyrolysis oil | % m/m | 1.6 | 3.6 | 4.2 |

When the liquid fraction PI+ is subjected to a steam cracking step, the process according to the invention makes it possible to achieve overall mass yields of ethylene and propylene, respectively, of 34.7% and 18.9% relative to the mass amount of initial feedstock of plastics pyrolysis oil type. When the PI-150° C. and 150° C.+ fractions are sent separately to the steam cracking unit, the process according to the invention makes it possible to achieve overall mass yields of ethylene and propylene, respectively, of 33.9% (=9.5+24.4) and 18.5% (=5.2+13.3) relative to the mass amount of initial feedstock of plastics pyrolysis oil type.

Furthermore, the specific sequence of steps upstream of the steam cracking step makes it possible to limit the formation of coke and to avoid the corrosion problems which would have appeared had the chlorine not been removed.

Example 2 (in Accordance with the Invention)

In this example, the fractionation step includes, in addition to a stripping column, a distillation section so as to obtain a diesel cut that can be integrated directly into a diesel pool, that is to say that meets the specifications required for a diesel and in particular the specification of T90 D86 at 360° C.

The feedstock to be treated is identical to that described in example 1 (cf. table 2).

It undergoes the steps a) of selective hydrogenation, b) of hydrotreatment and c) of separation, performed under the same conditions as those described in example 1. The liquid effluent obtained at the end of the separation step c) is sent to a stripping column, as in example 1. At the end of the stripping column, the two fractions PI-150° C. and 150° C.+ are obtained, as in example 1. They have the same characteristics as those of example 1 (cf. table 6). The 150° C.+ fraction is sent to a distillation column where it is distilled into two cuts: a 150-385° C. cut and a 385° C.+ cut. Table 10 gives the overall yields for the various fractions obtained on conclusion of the separation step c) and the fractionation step d) (which comprises a stripping column and a distillation column).

TABLE 10 yields of the various products obtained after separation and fractionation

| $NH_3 + H_2S$ | % m/m | 0.35 |
|---|---|---|
| Fraction C1-C4 | % m/m | 0.50 |
| Fraction PI– 150° C. | % m/m | 28.10 |
| Fraction 150_385° C.+ | % m/m | 60.90 |
| Fraction 385° C+ | % m/m | 14.63 |

Table 11 gives the characteristics of the 150-385° C. and 385° C.+ cuts, and the EN-590 commercial specifications of a diesel.

TABLE 11 characteristics of the 150-385° C and 385° C+ cuts, and EN-590 commercial specifications

| Characteristics | Units | Cut 150-385° C. | Cut 385° C.+ | Specifications EN-590 |
|---|---|---|---|---|
| Volume mass @ 15° C. | g/cm³ | 0.824 | 0.844 | 0.820-0.845 |
| Content of: | | | | |
| Sulfur | ppm by weight | <10 | <10 | <10 |
| Nitrogen | ppm by weight | <5 | <5 | |
| Cetane number D613 | — | 55.4 | — | >51 |
| Cetane index D4737A | — | 54.4 | — | >46 |
| Aromatic | % by weight | 2 | 2 | <11 |
| Simulated distillation D2887 | | | | |
| 0 | ° C. | 152 | 377 | |
| 5 | ° C. | 160 | 381 | |
| 10 | ° C. | 171 | 383 | |
| 30 | ° C. | 216 | 391 | |
| 50 | ° C. | 263 | 398 | |
| 70 | ° C. | 318 | 404 | |
| 90 | ° C. | 369 | 420 | |
| 95 | ° C. | 380 | 426 | |
| 100 | ° C. | 390 | 429 | |

TABLE 11-continued characteristics of the 150-385° C and 385° C+
cuts, and EN-590 commercial specifications

| Characteristics | Units | Cut 150-385° C. | Cut 385° C.+ | Specifications EN-590 |
|---|---|---|---|---|
| Distillation D86 | | | | |
| 0 | ° C. | 181 | 402 | |
| 5 | ° C. | 187 | 403 | |
| 10 | ° C. | 193 | 396 | |
| 30 | ° C. | 225 | 389 | |
| 50 | ° C. | 262 | 384 | |
| 70 | ° C. | 305 | 387 | |
| 90 | ° C. | 344 | 394 | |
| 95 | ° C. | 355 | 398 | <360° C. |
| 100 | ° C. | 358 | 395 | |

Table 11 shows that the 150-385° C. cut has the qualities required to be sent directly to the diesel pool.

Example 3 (not in Accordance with the Invention)

In this example, the hydrocarbon feedstock of pyrolysis oil type identical to that used in example 1 is sent directly to a steam cracking step.

The yields by mass of the various products obtained are calculated with respect to the initial feedstock (see table 12)

TABLE 12

| Yields of the steam cracking step | | |
|---|---|---|
| H2, CO, C1 | % m/m | 7.7 |
| Ethylene | % m/m | 33.1 |
| Propylene | % m/m | 18.0 |
| C4 cut | % m/m | 14.4 |
| Pyrolysis gasoline | % m/m | 20.3 |
| Pyrolysis oil | % m/m | 6.5 |

The yields of ethylene and propylene, obtained after direct steam cracking of the pyrolysis oil (process not in accordance with the invention) and presented in table 12, are lower than those obtained after steam cracking of a feedstock obtained from the treatment according to the process of the invention of the same plastics pyrolysis oil of example 1 (cf. table 8), which demonstrates the advantage of the process according to the invention. Additionally, the treatment of pyrolysis oil directly in a steam cracking furnace (example 2) resulted in increased coke formation requiring premature furnace shutdown.

The invention claimed is:

1. A process for treating a feedstock comprising a plastics pyrolysis oil, comprising:
    a) performing a selective hydrogenation in a reaction section fed with a liquid phase feedstock comprising a plastics pyrolysis oil and a gaseous stream comprising hydrogen, in the presence of at least one selective hydrogenation catalyst, under hydrogen partial pressure and temperature conditions that maintain the liquid phase, said selective hydrogenation being performed at a temperature of between 100 and 250° C., a partial pressure of hydrogen of between 1.0 and 10.0 MPa abs., and an hourly space velocity of between 1.0 and 10.0 $h^{-1}$, to obtain a hydrogenated effluent;
    b) performing a hydrotreatment in a hydrotreatment reaction section, comprising a fixed-bed reactor containing n catalytic beds, n being an integer greater than or equal to 1, placed in series and each comprising at least one hydrotreatment catalyst, said hydrotreatment reaction section being fed, at the first catalytic bed, with said hydrogenated effluent obtained from a) and a gaseous stream comprising hydrogen, said hydrotreatment being performed at a temperature of between 250 and 430° C., a partial pressure of hydrogen of between 1.0 and 10.0 MPa abs., and an hourly space velocity of between 0.1 and 10.0 $h^{-1}$, to obtain a hydrotreatment effluent; and
    c) performing a separation c) wherein the hydrotreatment effluent obtained from b) and an aqueous solution are fed to a washing and separation section, said separation being performed at a temperature of between 50 and 370° C., to obtain at least one gaseous effluent, an aqueous effluent, and a hydrocarbon effluent, wherein separation c) further comprises injection of the aqueous solution into the hydrotreatment effluent from b), upstream of the washing and separation section.

2. The process as claimed in claim 1, further comprising a0) pretreating the feedstock comprising a plastics pyrolysis oil in an adsorption section fed with said feedstock, wherein said pretreating is performed at a temperature of between 0 and 150° C. and at a pressure of between 0.15 and 10.0 MPa absolute, in the presence of at least an adsorbent having a specific surface area of greater than or equal to 100 $m^2/g$.

3. The process as claimed in claim 1, wherein the selective hydrogenation a) is performed at a temperature of between 110 and 200° C.

4. The process as claimed in claim 1, wherein an amount of hydrogen fed to the reaction section of a) is between 1 and 50 $Nm^3$ of hydrogen per $m^3$ of feedstock.

5. The process as claimed in claim 1, wherein the reaction section of a) comprises at least two reactors operating in a permutable system.

6. The process as claimed in claim 1, wherein n is an integer greater than 1, and said process further comprises introducing an additional gaseous stream comprising hydrogen at the inlet of each catalytic bed from the second catalytic bed of the hydrotreatment reaction section of b).

7. The process as claimed in claim 1, wherein an amount of the gaseous stream fed to the hydrotreatment reaction section b) is such that the hydrogen coverage is between 50 and 500 $Nm^3$ of hydrogen per $m^3$ of hydrogenated effluent.

8. The process as claimed in claim 1, wherein said at least one hydrotreatment catalyst comprises a support and a hydro-dehydrogenating function comprising at least one group VIII element and/or at least one group VIB element.

9. The process as claimed in claim 1, wherein said at least one hydrotreatment catalyst has a specific surface area of greater than or equal to 250 m²/g.

10. The process as claimed in claim 1, further comprising a fractionation d) fed with the hydrocarbon effluent.

11. The process as claimed in claim 1, further comprising a steam cracking e) fed with the hydrocarbon effluent, performed in at least one pyrolysis furnace at a temperature of between 700 and 900° C.

12. The process as claimed in claim 1, further comprising a0) pretreating the feedstock comprising a plastics pyrolysis oil in an adsorption section fed with said feedstock, wherein said pretreating is performed at a temperature of between 5 and 100° C. and at a pressure of between 0.2 and 1.0 MPa absolute, in the presence of at least an adsorbent having a specific surface area of greater than or equal to 200 m²/g.

13. The process as claimed in claim 1, wherein an amount of hydrogen fed to the hydrotreatment reaction section b) is between 100 and 300 Nm³ of hydrogen per m³ of hydrogenated effluent.

14. The process as claimed in claim 1, wherein said at least one hydrotreatment catalyst comprises a support selected from alumina, silica, silica-aluminas, magnesia, clays, and mixtures thereof and a hydro-dehydrogenating function comprising at least one group VIII element selected from nickel and cobalt and/or at least one group VIB element selected from molybdenum and tungsten.

15. The process as claimed in claim 1, further comprising injecting an amine stream upstream of the selective hydrogenation a), between the selective hydrogenation a) and the hydrotreatment b) and/or between the hydrotreatment b) and the separation c).

16. The process as claimed in claim 1, wherein the selective hydrogenation a) is performed at a temperature of between 130 and 180° C.

17. The process as claimed in claim 1, wherein an amount of hydrogen fed to the reaction section of a) is between 5 and 20 Nm³ of hydrogen per m³ of feedstock.

18. The process as claimed in claim 1, wherein said at least one selective hydrogenation catalyst comprises an alumina support and a hydro-dehydrogenating function comprising at least 0.1 wt % and less than 1 wt % nickel, expressed as nickel oxide NiO, relative to the weight of said catalyst, and at least 0.1 wt % and less than 5 wt % molybdenum, expressed as molybdenum oxide MoO₃, relative to the weight of said catalyst.

19. The process as claimed in claim 1, wherein the selective hydrogenation a) is performed at a temperature of between 130 and 180° C., wherein an amount of hydrogen fed to the reaction section of a) is between 5 and 20 Nm³ of hydrogen per m³ of feedstock, and wherein said at least one selective hydrogenation catalyst comprises an alumina support and a hydro-dehydrogenating function comprising at least 0.1 wt % and less than 1 wt % nickel, expressed as nickel oxide NiO, relative to the weight of said catalyst, and at least 0.1 wt % and less than 5 wt % molybdenum, expressed as molybdenum oxide MoO₃, relative to the weight of said catalyst.

* * * * *